Oct. 21, 1952     S. BENIAN     2,614,877
BUMPER GUARD
Filed Oct. 17, 1951
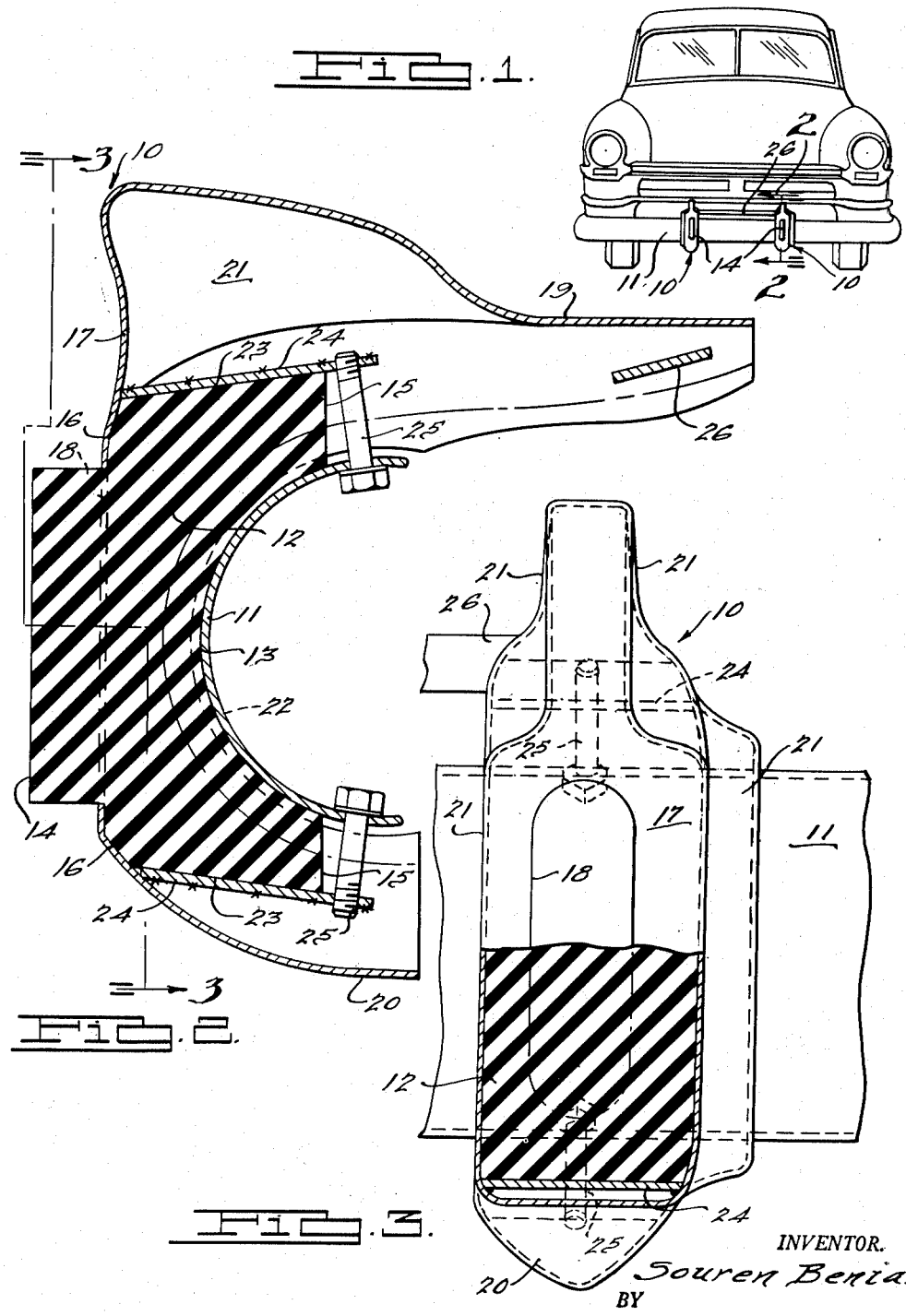
INVENTOR.
Souren Benian.
BY
Elmer Jamison Gray
ATTORNEY.

Patented Oct. 21, 1952

2,614,877

UNITED STATES PATENT OFFICE 2,614,877

BUMPER GUARD

Souren Benian, Detroit, Mich.

Application October 17, 1951, Serial No. 251,747

7 Claims. (Cl. 293—66)

This invention relates to a bumper guard for the horizontal bumper bar of an automobile.

An object of the invention is to provide an improved construction in a vehicle bumper guard which is comparatively simple and economically fabricated and assembled, yet which is particularly rugged and efficient in operation.

Another object is to provide an improved bumper guard of the foregoing nature comprising a rubber-like shock transmitting body having a shock receiving projection extending longitudinally outward with respect to the vehicle body and having a bumper abutting surface opposite the projection and conforming closely to the outer surface of the horizontal bumper bar. The rubber-like body is closely confined within a metal sheath which is secured to the bumper bar above and below the latter. The sheath is provided with an opening through which the projection extends and is spaced from the adjacent portions of the bumper bar to avoid contact therewith. Thus transverse expansion of the body under shock is minimized and shocks received by the projection are transmitted through the body directly to the bumper bar.

Still another object is to provide an improved bumper guard construction comprising a pair of transversely spaced bumper guards of the foregoing nature. The housing of each guard is provided with upper and lower forward or outer portions which extend vertically above and below the rubber-like body to afford additional protection to the vehicle, as for example in pushing another vehicle having a bumper at a different height from the road. In this construction, the upper portion of each housing also extends inward over the bumper to comprise a bracket. A transverse reinforcing bar spacing the two guards is rigidly secured at its ends to the inward ends of the brackets, which thus mutually support each other against torsional forces.

Other objects of this invention will appear in the following description and appended claims, reference being had to the accompanying drawings forming a part of this specification wherein like reference characters designate corresponding parts in the several views.

Fig. 1 is a front view of a vehicle body having a bumper guard structure embodying the present invention mounted thereon.

Fig. 2 is an enlarged longitudinal vertical section through the left guard, taken in the direction of the arrows along the line 2—2 of Fig. 1.

Fig. 3 is a fragmentary vertical sectional view taken in the direction of the arrows substantially along the broken line 3—3 of Fig. 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example comprising a pair of generally similar transversely spaced guards or dogs 10 secured to the horizontal bumper bar 11 of an automobile. Each guard 10 comprises a shock transmitting body 12 of rubber or rubber-like material having a cylindrical inner bumper abutting surface 13 conforming closely to the outer surface of the bumper 11, which in the present instance is generally a half-circle in sectional view. Opposite the surface 13, the body 12 is provided with a longitudinally outward extending shock receiving projection 14. As indicated, the surface 13 and the projection 14 each have substantially the same vertical width as the bumper 11, whereas the body 12 extends above and below the surface 13 and projection 14, as well as to either side of the latter, to provide inner shoulder portions 15 above and below the surface 13 and outer shoulder portions 16 around the base of the projection 14.

Each body 12 completely fills a hollow metal supporting sheath and is thus maintained substantially in shape under shock. Each sheath comprises in part a rigid housing having an outer face plate 17 closely conforming to the shoulder portions 16 and extending both above and below the latter to provide additional protective area, as for example when bumped against a non-mating bumper of another vehicle. An orifice 18 in the plate 17 is provided for the projection 14. From the plate 17, the upper portion of the housing extends longitudinally inward or rearward of the bumper 11 as a downward opening channel bracket 19. Also from the plate 17, the housing extends rearward under the bumper 11 as an upward opening lower channel-like extension 20. The opposed sides 21 of the housing extend rearward or longitudinally inward toward the vehicle from the plate 17, closely sheathing adjacent portions of the rubber-like body 12 and comprising the channel sides of the rearward bracket 19 and extension 20. The inner edges of the sides 21 confronting the outer or forward surface of the bumper 11 are curved at 22, Fig. 2, in accordance with the contour of the bumper and terminate slightly outward of the latter so as to avoid contact therewith, yet to afford lateral support for the greater part of the rubber-like body 12 between the bumper 11 and outer housing plate 17.

The upper and lower surfaces 23 of the body 12 converge slightly forward or longitudinally outward toward each other to facilitate assembly of the housing and rubber-like body by insertion of the latter into the open inner or rearward end of the housing. Closely overlying the surfaces 23 are a pair of upper and lower sheath plates 24 welded to the housing sides 21 and outer face plate 17. These sheath plates extend rearward beyond the shoulders 15 and are secured near their ends to the adjacent rearwardly curved upper and lower portions of the bumper 11 by generally vertically extending bolts 25.

By the structure described thus far, each rubber-like body 12 is completely enclosed, except at the projection 14 and shoulders 15, between the housing face and side plates 17 and 21, the upper and lower plates 24, and the bumper 11. Longitudinal impacts received by the forwardly extending projection 14 are transmitted directly through the body 12 and surface 13 to the bumper 11, which thus receives substantially the full impact. The rigid housing on the other hand merely supports the rubber-like body 12 against deformation transversely to the impact, but does not receive the impact directly.

In order to add rigidity to the guards 10 and to provide mutual reinforcement for each other against torsional forces, each rearward bracket 19 is secured to an end of a transverse tie-bar 26. Thus upon the application of force to the upper portion of either face plate 17, for example, tending to twist or cock the associated guard with respect to the bumper, the other guard acting through the tie-bar 26 assists in the resistance of the force. The reinforcement afforded by the bar 26 is particularly important in the event that one of the guards should become partially loosened and is enhanced by the length of the rearward extension or lever arm of each bracket 19.

I claim:

1. In a bumper guard for a vehicle bumper, a rubber-like shock transmitting body having a shock receiving projection extending longitudinally outward and also having a bumper abutting portion directed inwardly of said projection and shaped to conform substantially to the outer surface of the bumper, thereby to transmit shocks directly thereto received by said projection, a metallic sheath for said body having a forward upright wall formed with an opening of less height than said wall and through which said projection extends, said body having extensions disposed above and below said opening in abutting relation to portions of said wall, and means for securing the sheath to said bumper.

2. In a bumper guard for a vehicle bumper, a rubber-like shock transmitting body having generally oppositely facing inner and outer end surfaces, said body having an integral shock receiving projection extending longitudinally outward from said outer end surface, the inner end surface having a bumper abutting surface shaped to conform closely to the outer surface of the bumper, thereby to transmit shocks directly thereto received by said projection, a rigid hollow housing for said body extending above and below the latter and having an opening through which said projection extends, the sides of said housing sheathing said body closely in laterally supporting relation, rigid means secured within the housing closely sheathing the body above and below the latter in supporting relation, the inner edge portions of the housing adjacent the bumper conforming generally to the contour thereof and being spaced therefrom, and means securing said rigid means within the housing to said bumper.

3. In a bumper guard for a vehicle bumper, a rubber-like shock transmitting body having a vertical width greater than the corresponding width of said bumper and having generally oppositely facing inner and outer end surfaces, said body having an integral shock receiving projection of substantially the vertical width of said bumper and extending longitudinally outward from said outer end surface, the inner end surface having a bumper abutting surface shaped to conform closely to the outer surface of the bumper, thereby to transmit shocks directly thereto received by said projection, a rigid hollow housing for said body extending above and below the latter, the housing having an outer surface portion closely sheathing the outer end surface of the body in supporting relation and provided with an opening through which said projection extends, the sides of said housing having portions closely sheathing the sides of said body in laterally supporting relation, rigid means secured within the housing closely sheathing the body above and below the latter in supporting relation, the inner edge portions of the housing adjacent the bumper conforming generally to the contour thereof and being spaced therefrom, and means securing said rigid means within the housing to said bumper.

4. In a bumper guard for a vehicle bumper, a rubber-like shock transmitting body having a shock receiving projection of substantially the vertical width of said bumper and extending longitudinally outward from the outer end of said body, said body also having at its inner end a bumper abutting surface opposite said projection and conforming closely to the outer surface of the bumper to transmit shocks directly thereto received by said projection, said body extending vertically above and below said projection and surface to provide outer and inner shoulders above and below the projection at its juncture with the body and also above and below said bumper abutting surface, a rigid hollow housing for said body extending above and below the latter, the housing having an outer surface closely sheathing said outer shoulders and extending above and below the latter and also having an opening through which the projection extends, the housing also having side portions closely sheathing the sides of the body in laterally supporting relation and terminating inward in spaced relation to the bumper to avoid contact therewith, upper and lower rigid sheathing plates secured within the housing and closely sheathing the body above and below the latter respectively in supporting relation, the upper and lower sheathing plates extending longitudinally inward beyond said upper and lower shoulders, and means securing the inner ends of the inward extending sheathing plates to said bumper.

5. A bumper guard for a vehicle bumper comprising a rubber-like shock transmitting body having a shock receiving projection of substantially the vertical width of said bumper and extending longitudinally outward from the outer end of said body, said body also having at its inner end a bumper abutting surface opposite said projection and conforming closely to the outer surface of the bumper to transmit shocks directly thereto received by said projection, said body extending vertically above and below said projection and surface to provide outer and inner shoulders above and below the projection at its juncture with the body and also above and below said bumper abutting surface, a rigid hollow housing for said body extending above and below the latter, the housing having an outer surface closely sheathing said outer shoulders and extending above and below the latter and also having an opening through which the projection extends, the housing also having side portions closely sheathing the sides of the body in laterally supporting relation and terminating inward in spaced relation to the bumper to avoid contact therewith, upper and lower rigid sheathing plates secured within the housing and closely sheathing the body above and below the latter respectively in supporting relation, the upper and lower sheathing plates extending longitudinally inward beyond said upper and lower shoulders, means securing the inner ends of the inward extending sheathing plates to said bumper, the upper portion of the housing having an integral bracket extending longitudinally inward above the bumper, a second bumper guard substantially the same as the above defined bumper guard, and a transverse rod spacing said two bumper guards and secured at its opposite ends to the inner ends of said brackets.

6. A bumper guard for a vehicle bumper comprising a rubber-like shock transmitting body having generally oppositely facing inner and outer end surfaces, said body having an integral shock receiving projection extending longitudinally outward from said outer end surface, the inner end surface having a bumper abutting surface being shaped to conform closely to the outer surface of the bumper, thereby to transmit shocks directly thereto received by said projection, a rigid hollow housing for said body extending above and below the latter, the housing opening rearward and having an outer portion closely sheathing the outer end surface of said body, said outer housing portion having an opening through which said projection extends, the sides of said housing sheathing the sides of said body closely in laterally supporting relation, rigid means secured within the housing closely sheathing the body above and below the latter in supporting relation, the inner edge positions of the housing adjacent the bumper conforming generally to the contour thereof and being spaced therefrom, means securing said rigid means within the housing to said bumper, the upper portion of the housing having an integral bracket extending longitudinally inward above the bumper, a second bumper guard substantially the same as the above defined bumper guard, the two bumper guards being secured to the bumper in transversely spaced relation at opposite sides of the middle thereof, and a transverse rod spacing said two bumper guards and secured at its opposite ends to the inner ends of said brackets.

7. A bumper guard according to claim 1 in which said means includes vertically spaced forwardly extending members engaging said extensions above and below said opening.

SOUREN BENIAN.

REFERENCES CITED

The following references are of record in the file of this patent:

UNITED STATES PATENTS

| Number | Name | Date |
|---|---|---|
| 2,539,955 | Kinsey | Jan. 30, 1951 |